United States Patent
Ward

(10) Patent No.: US 8,000,464 B1
(45) Date of Patent: Aug. 16, 2011

(54) METHOD OF MANAGING A PEERING DATABASE IN A TELECOMMUNICATIONS NETWORK

(75) Inventor: John Ward, Johnstown, CO (US)

(73) Assignee: IntelePeer Inc., San Mateo, CA (US)

( * ) Notice: Subject to any disclaimer, the term of this patent is extended or adjusted under 35 U.S.C. 154(b) by 0 days.

(21) Appl. No.: 12/729,770

(22) Filed: Mar. 23, 2010

(51) Int. Cl.
*H04M 7/00* (2006.01)

(52) U.S. Cl. .............. 379/221.01; 370/217; 379/221.13; 379/221.14

(58) Field of Classification Search .................. 370/217, 370/218, 221, 222, 351–356, 392, 399, 395.2, 370/395.21, 395.31, 395.32, 400, 401; 379/201.01, 379/219, 221.01, 221.13, 221.14, 230, 272–277, 379/220.01; 455/445; 709/203
See application file for complete search history.

(56) References Cited

U.S. PATENT DOCUMENTS

| 5,910,981 | A * | 6/1999 | Bhagat et al. ................. 379/219 |
| 7,382,767 | B2 * | 6/2008 | Stumer ........................ 370/352 |
| 7,529,231 | B2 * | 5/2009 | Soo et al. ...................... 370/352 |
| 7,702,092 | B2 * | 4/2010 | Sheth et al. ............. 379/221.13 |
| 2010/0011111 | A1 * | 1/2010 | Vizaei ........................ 709/228 |

* cited by examiner

*Primary Examiner* — Harry Hong
(74) *Attorney, Agent, or Firm* — DLA Piper LLP (US)

(57) ABSTRACT

When a call offer is received by a telecommunications peering network destined for a telephone number maintained within a peering database, the telecommunications peering network attempts to route the call directly to the peering partner telecommunications (e.g., broadband, voice over internet protocol, etc.) equipment. If the route fails with a corresponding destination unreachable failure code, the telecommunications peering network can attempt to determine whether or not the telephone number has been ported to a different provider. If the telecommunications peering network determines that the telephone number has been ported, the telecommunications peering network removes the telephone number from the peering database.

17 Claims, 4 Drawing Sheets

METHOD OF MANAGING A PEERING DATABASE IN A TELECOMMUNICATIONS NETWORK

TECHNICAL FIELD

The subject matter of this application is generally related to telecommunications.

BACKGROUND

A telecommunications carrier, such as a competitive local exchange carrier (CLEC) or an incumbent local exchange carrier (ILEC), provides telecommunications access, such as voice and data communications, to customers. Each telecommunications carrier may maintain private network equipment as well as lease network equipment access from other telecommunications carriers.

The telecommunications carrier network can include various forms of communication networks and equipment, including but not limited to: switches, routers, hubs, repeaters, bridges, servers, etc. The network can include packet-switched data networks (e.g., the Internet, intranets, extranets, subnets), the public switched telephone network (PSTN), wireless networks, local area networks (LANs), wide area networks (WANs), peer-to-peer networks, satellite networks, radio and television broadcast networks, optical networks, metro area networks (MANs), computer networks, grid networks, exchanges (e.g., private branch exchange (PBX)), broadband integrated data services network (B-ISDN), access networks, digital subscriber lines (DSL), cable, etc.

A telecommunications service provider, such as a broadband telecommunications service solutions provider, purchases telephone numbers from the telecommunications carrier and assigns the numbers to customers, providing the customers, in some implementations, with a greater variety of service options, business solutions, and/or communications applications. For example, the telecommunications service provider may present the customer with an enterprise solution combining multiple communications technologies and a rich variety of voice and data services in an integrated package.

A customer purchases service from the telecommunications carrier or the telecommunications service provider to gain telecommunications network access for one or more communication devices owned or operated by the customer. The communication devices can include any device capable of transmitting or receiving voice and/or data, including but not limited to: telephones, smart phones, mobile phones, personal digital assistants (PDAs), computers, FAX machines, Internet-enable devices, media players, set-top boxes, email devices, etc. The service can include the assignment of a telephone number for voice communications via a land line, cellular phone, GPS phone, or other voice communications device.

Although a customer may purchase service from a first service provider, the customer may decide at a later point to switch from the first service provider to a second service provider. For example, the customer may determine that cost savings or greater dependability is available through the second service provider. Rather than losing the assigned telephone number, the customer often can request that the assigned telephone number be ported from the first service provider to the second service provider.

SUMMARY

When a call offer is received by a telecommunications peering network destined for a telephone number maintained within a peering database, the telecommunications peering network attempts to route the call directly to the peering partner telecommunications (e.g., broadband, voice over internet protocol, etc.) equipment. If the route fails with a corresponding destination unreachable failure code, the telecommunications peering network can attempt to determine whether or not the telephone number has been ported to a different provider. If the telecommunications peering network determines that the telephone number has been ported, the telecommunications peering network removes the telephone number from the peering database.

In some implementations, a method includes: receiving, at a telecommunications peering network, a first call offer for a call destined for a telephone number; querying a peering database to determine if the telephone number is assigned to a peering partner of the telecommunications peering network; determining that the telephone number is assigned to a first peering partner; providing a second call offer for the call to the first peering partner; receiving a destination unreachable message from the first peering partner regarding the second call offer; switching the call to a public telecommunications network; and receiving a cause code from the public telecommunications network indicating whether the call can be routed.

Other implementations are disclosed, including implementations directed to systems, methods, apparatuses and computer-readable mediums.

DETAILED DESCRIPTION

Example Telecommunications Network with Peering Database

Figure 1:
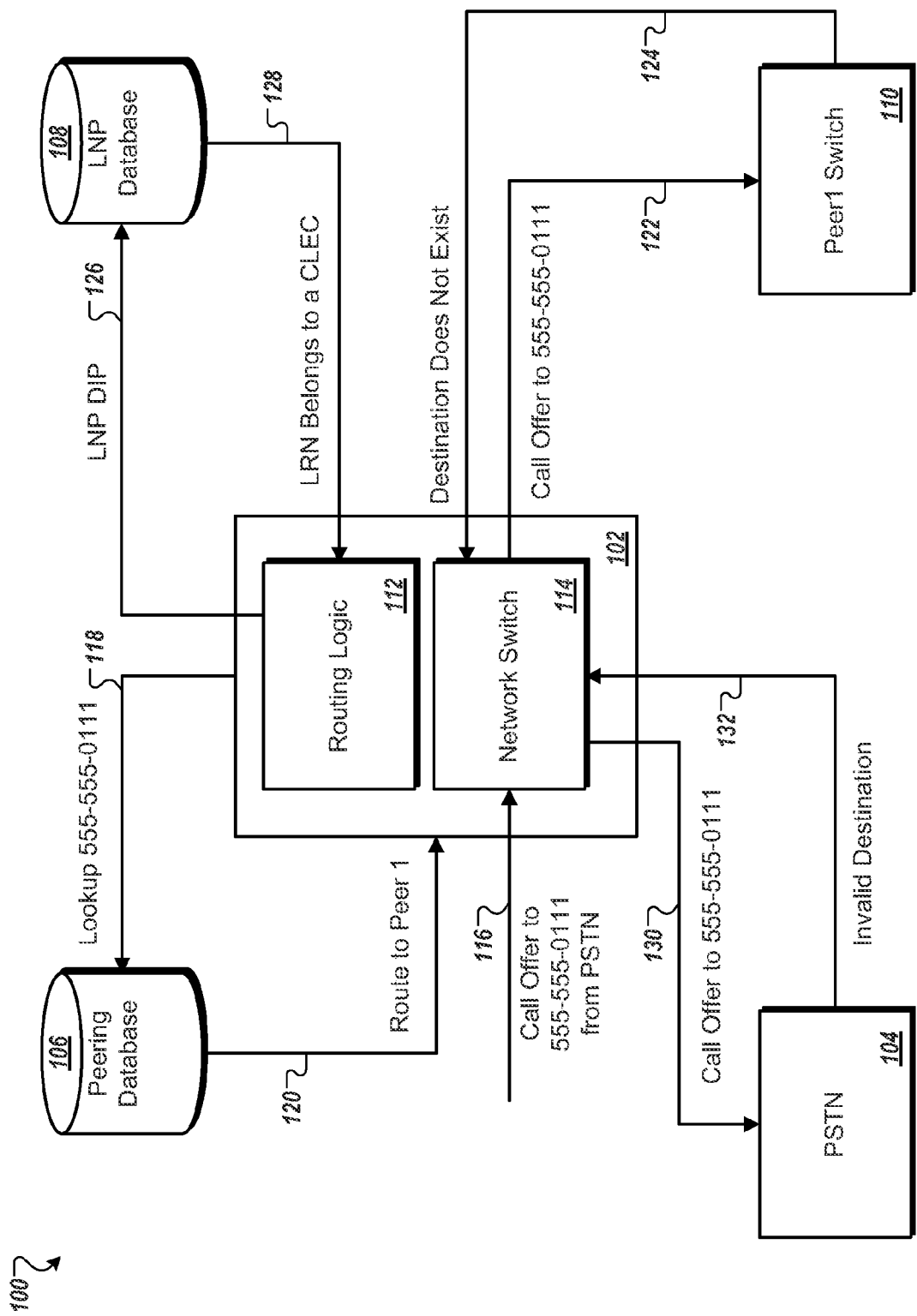
FIG. 1 is a block diagram of an example telecommunications network for maintaining accurate peering information based upon call routing behavior while facilitating voice traffic connections.

FIG. 1 is a block diagram of an example telecommunications network 100 for maintaining accurate peering information based upon call routing behavior while facilitating voice or data traffic connections. In some implementations, the telecommunications network 100 includes a peering infrastructure 102, a public telecommunications network 104, a peering database 106, a local number portability (LNP) database 108, and a peering partner network edge switch 110.

The peering infrastructure 102 can provide peering partners with direct broadband routing of telecommunications calls from the peering infrastructure network to the peering partner network access equipment. In some implementations, peering partners can include organizations which have many telephone numbers such as, in some examples, corporate enterprises, educational campuses, telecommunications carriers, telecommunications service providers, internet service providers (ISP), application service providers (ASP), or government entities. A peering partner, for example, can register telephone numbers with the peering infrastructure 102 along with routing information, such as the internet protocol (IP) address of a peering partner edge routing device or other network address which provides access to telecommunications devices assigned to the peering partner. In some implementations, individuals can also register broadband network-based telecommunications devices, such as a softphone, with the peering infrastructure 102. The registered telephone numbers can be stored within the peering database 106. In some implementations, the peering database 106 is included within the peering infrastructure 102.

The peering infrastructure 102, in some implementations, can include routing logic 112 and a network switch 114. In other implementations, the routing logic 112 can be included within the network switch 114. In one example, the peering infrastructure 102 can include a Softswitch or virtual PBX which is operable to perform various communication tasks over a packet-switched network, such as dialing endpoints, bridging call legs and facilitating Integrated Voice Response (IVR) exchanges. Other implementations are possible. In simplified terms, the routing logic 112 computes a path for reaching the destination requested within a call offer and the network switch 114 performs the switching maneuver necessary to move the call offer along towards its destination. For example, the network switch 114 can include logic for translating between a first telecommunications protocol and a second telecommunications protocol.

When a call offer destined for a telephone number registered by a peering partner is received by the peering infrastructure 102, the peering infrastructure 102 can look up the destination telephone number in the peering database 106 and route the call offer to the associated address. In one example, the public telecommunications network 104 (e.g., the public switched telephone network (PSTN)) issues a call offer to the peering infrastructure 102. The network switch 114 within the peering infrastructure 102 receives the call offer. The network switch 114 communicates the destination telephone number to the routing logic 112. The routing logic 112 performs a database query, locating information regarding the telephone number within the peering database 106. If the telephone number is discovered within the peering database 106, the routing logic 112 provides the destination address of the peering partner telecommunications equipment (e.g., the peering partner network edge switch 110) to the network switch 114. The network switch 114 routes the call offer to the peering partner network edge switch 110.

In some implementations, the telephone numbers registered by the peering partners can be allocated to individuals such as, in some examples, customers of a telecommunications carrier, telecommunications service provider, ISP, or ASP, employees of a corporate enterprise, or members of an educational community. An individual allocated a telephone number by a peering partner may later decide to switch to a different provider. If an individual is displeased with the quality of service offered by a first service provider, for example, the customer can choose to switch to a second service provider. In many cases, switching from a first service provider to a second service provider involves porting the telephone number between the two service providers.

If the first service provider is registered with the peering infrastructure 102 as a peering partner, in some implementations, the information within the peering database 106 may not be immediately updated upon the porting of the telephone number. For example, the peering infrastructure 102 may depend upon the peering partners to provide update information regarding the status of individual telephone numbers registered within the peering database 106. To avoid the circumstance of repeatedly attempting to route a ported number to the incorrect destination (e.g., the first service provider), the peering infrastructure 102 can include a method for detecting ported telephone numbers and removing them from the peering database 106.

As illustrated within FIG. 1, an example process for detecting ported peer telephone numbers begins when a call offer (116) for telephone number 555-555-0111 is received by the network switch 114 of the peering infrastructure 102. The peering infrastructure 102 looks up (118) the telephone number 555-555-0111 within the peering database 106 and determines that the telephone number 555-555-0111 belongs to a first peering partner Peer 1. The routing information for Peer 1 is received (120) by the peering infrastructure 102 within a query response. The peering infrastructure 102 provides the routing information to the network switch 114 which routes the call offer (122) to the peering partner network edge switch 110. The peering partner network edge switch 110 responds (124) with a code correlating to an invalid or unknown destination.

The peering infrastructure 102, through monitoring the status of the call offer as it is being routed, recognizes a potential problem with the peer telephone number 555-555-0111 due to the response from the peering partner network edge switch 110. In some implementations, the peering infrastructure 102 can query a local number portability database regarding the telephone number 555-555-0111 to check whether the telephone number has been ported. For example, the routing logic 112 can perform an LNP dip (126) of the LNP database 108. If the LNP database 108 responds to the LNP dip verifying that the telephone number has been routed, for example, the peering infrastructure 102 can update the peering database 106 and/or other peering information accordingly (e.g., flag the record within the peering database 106, delete the record from the peering database 106, issue a communication to the peering partner Peer 1 regarding the ported telephone number, etc.).

Returning to the illustrated example, the LNP database 108 responds (128) that the local routing number associated with the telephone number 555-555-0111 belongs to a particular CLEC. The response received by the routing logic 112 does not suggest that the telephone number has been ported. However, in some circumstances, the LNP database 108 may not contain accurate information regarding the telephone number 555-555-0111. For example, if the telephone number 555-555-0111 was ported recently, it may take a while for the LNP database 108 to be updated.

The network switch 114 next issues (130) the call offer for telephone number 555-555-0111 to the public telecommunications network 104. The public telecommunications network 104, such as the PSTN, in most circumstances can route a call offer to a recently ported telephone number. As such, if the public telecommunications network 104 responds to the call offer with a cause code associated with a successful call termination (e.g., connected, line busy, etc.), the peering infrastructure 102 can anticipate that the telephone number 555-555-0111 has been ported and react accordingly. The public telecommunications network 104, in the example illustrated within FIG. 1, responds (132) with a cause code corresponding to an invalid destination. The response can relate to a temporary state such as disconnection due to late payment of a bill. In some implementations, because the peering infrastructure 102 may not be able to accurately determine the status of the telephone number 555-555-0111, the peering infrastructure 102 maintains the telephone number within the peering database 106. In other implementations, the peering infrastructure 102 can add an indication to the database record corresponding to the telephone number 555-555-0111 within the peering database 106, logging a problem with routing the number. The peering infrastructure 102, for example, can continue to monitor the accessibility of the telephone number 555-555-0111 with relation to the peering partner Peer 1.

Example Process for Porting a Telephone Number

Figure 2:
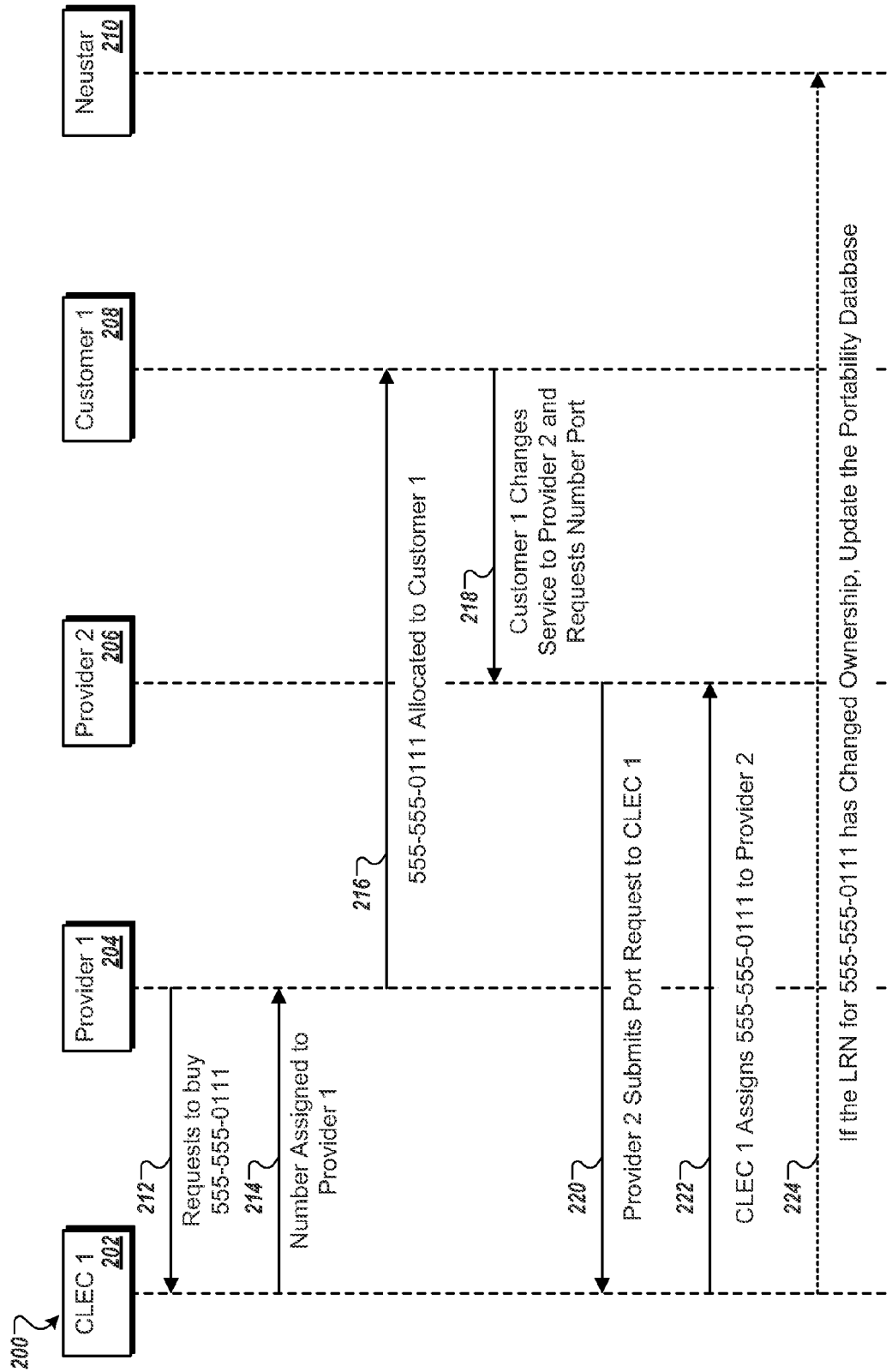
FIG. 2 is a swim lane diagram of an example process for porting a telephone number assigned to a customer by a first provider to a second provider.

FIG. 2 is a swim lane diagram of an example process 200 for porting a telephone number assigned to a customer 208 by a first provider 204 to a second provider 206. The process 200, in some implementations, includes a CLEC 202 and a portability and network management database 210.

In some implementations, the process 200 begins when the first provider 204 requests to buy (212) the telephone number 555-555-0111 from the CLEC 202. The first provider 204, for example, can purchase access to a block of numbers, allocating the numbers to customers. The first provider 204, in some examples, may be a telecommunications service provider, third party telecommunications service provider, ISP, or ASP.

In response, the CLEC 202 assigns (214) the purchased numbers, including the telephone number 555-555-0111, to the first provider 204. Although the telephone number 555-555-0111 has been assigned to the first provider 204, in some implementations, the CLEC 202 maintains ownership of the telephone number. For example, the local routing number (LRN) associated with the telephone number 555-555-0111 refers to a ten digit code corresponding to a switch maintained by the CLEC 202 through which the telephone number can be routed. Although the first provider 204 provides services (e.g., voice mail, call waiting, conference calling, etc.) to individual customers and manages billing for customers, in some implementations, call offers destined to the telephone number 555-555-0111 continue to default to routing through the CLEC 202.

At some later point in time, the customer 208 signs up for service with the first provider 204, and the first provider 204 allocates (216) the telephone number 555-555-0111 to the customer 208. In one example, the customer 208 can purchase cellular phone service from the first provider 204, including a new cellular phone, and the first provider 204 can allocate the telephone number 555-555-0111 to the new phone during cellular phone service setup for the customer.

Down the road, the customer 208 may decide that the service provided by the first provider 204 is not a good value. For example, the customer 208 may determine that the second service provider 206 offers superior features, a lower price, or better service connection than the first provider 204. The customer 208, in some implementations, can contact the second provider 206, requesting a change of service (218) along with the porting of the telephone number 555-555-0111. In another example, the first service provider 204 may go out of business, coordinated with an automatic switch of services to the second service provider 206 for all customers who do not actively pursue service with an alternate provider. Other reasons and means for switching service between the first service provider 204 and the second service provider 206 are possible.

The second provider 206 submits a port request (220) of the telephone number 555-555-0111 to the CLEC 202. In response, the CLEC 202 authorizes assignment of the telephone number 555-555-0111 to the second provider 206 and facilitates the porting of the number (222).

The CLEC 202, in some implementations, can determine whether or not the second provider 204 is a customer of the CLEC 202. If the second provider 204 is a customer of the CLEC 202, the LRN number associated with the telephone number 555-555-0111 can remain the same, and the CLEC 202 can continue as the default route of the telephone number 555-555-0111. If, instead, the second provider 204 is not a customer of the CLEC 202, the CLEC 202 can coordinate the port of the LRN associated with the telephone number 555-555-0111 to a telecommunications carrier which has a relationship with the second provider 206.

In some implementations, the port includes obtaining a new LRN associated with the telephone number 555-555-0111 and updating (224) the portability management database 210 with the new LRN for the telephone number. The portability management database 210, for example, can be part of the Neustar global communications clearinghouse and directory services.

Although the process 200 has been described in relation to porting between service providers, in other implementations, the telephone number 555-555-0111 can be geographically ported or service ported. In the example of geographic porting, the telephone number 555-555-0111 can remain with the same service provider, while the LRN is modified at the CLEC. During service porting, a same service provider, in one example, can port the telephone number 555-555-0111 from plain old telephone service (POTS) to an integrated services digital network (ISDN), including the modification of the LRN at the CLEC. Other circumstances are possible.

Example Peering Database Maintenance

Figure 3:
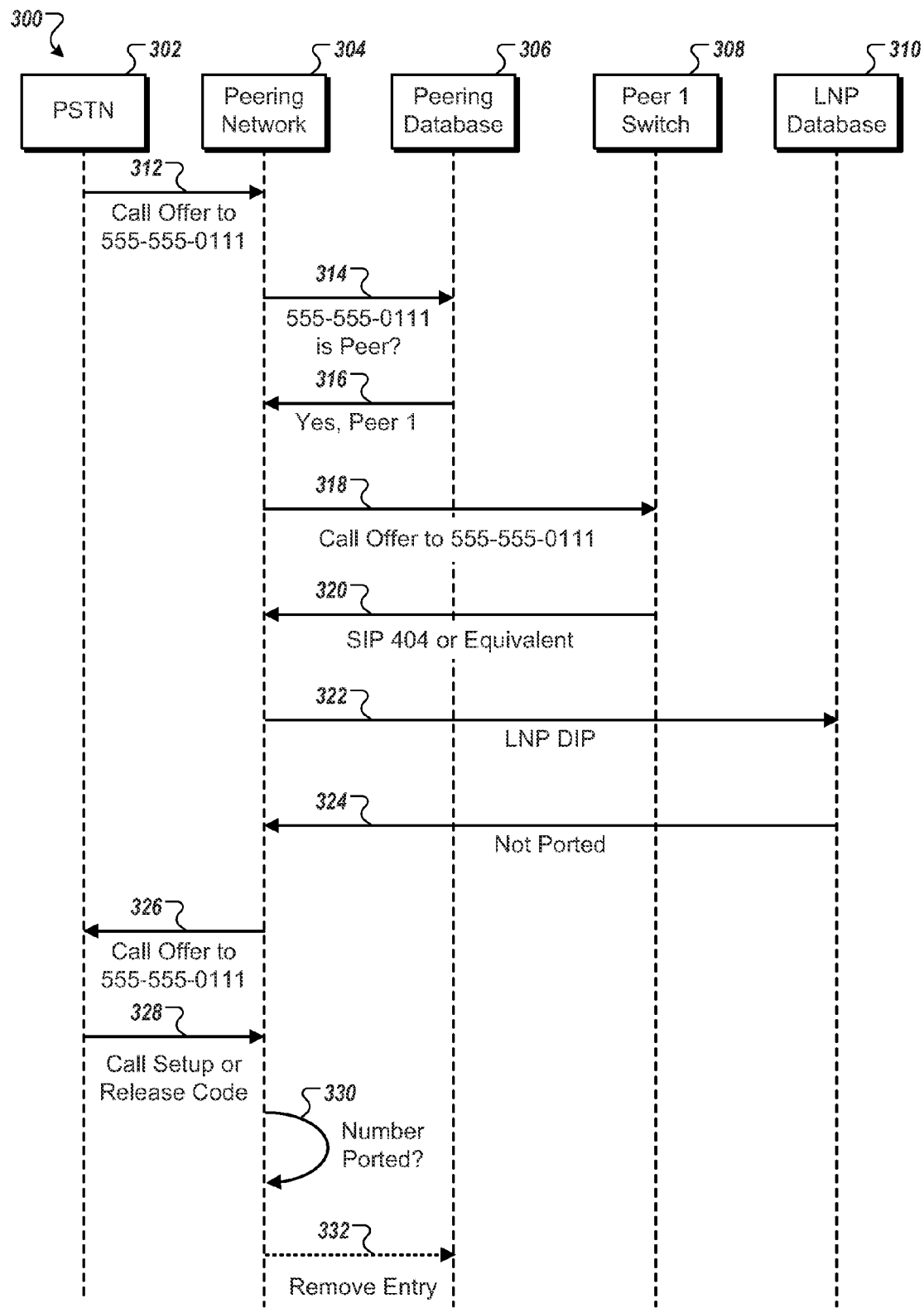
FIG. 3 is a swim lane diagram of an example process for maintaining accurate peering information based upon call routing behavior while facilitating voice traffic connections.

FIG. 3 is a swim lane diagram of an example process 300 for maintaining accurate peering information based upon call routing behavior while facilitating voice traffic connections. In some implementations, the process 300 includes a public telecommunications network 302, a peering network interface 304, a peering database 306, a peering partner switch 308, and a local number portability database 310.

The process 300 begins with receiving a call offer to the telephone number 555-555-0111 (312) at the peering network interface 304, from the public telecommunications network 302. The peering network interface 304, in some implementations, can be similar to the peering infrastructure 102, as described in relation to FIG. 1. For example, the peering network interface 304 can include the ability to determine routes for call offers and to switch telecommunications traffic. The call offer, in some implementations, originates from the public switched telephone network (PSTN).

The peering network interface 304 queries (314) the peering database 306 to determine whether or not the telephone number 555-555-0111 belongs to a peering partner. The peering network interface 304 receives (316) a query response indicating that the telephone number belongs to a first peering partner. In some implementations, the query response includes network address information which the peering network interface 304 can use to route the call offer to the telephone number 555-555-0111.

The peering network interface 304 provides (318) the call offer for telephone number 555-555-0111 to the peering partner switch 308. For example, the peering network interface 304 can route the call offer to the network address provided by the peering database 306. In some implementations, the network address includes an internet protocol (IP) address.

The peering partner switch 308 responds (320) to the call offer with a destination unreachable response. In some implementations, the destination unreachable response can be included within a Session Initiation Protocol (SIP) message, a Signaling System Number 7 (SS7) protocol message, a Q.931 protocol message, or a H.323 protocol message. In some examples, the destination unreachable response can include a SIP 404 response or an equivalent, such as a bad request, unauthorized, forbidden, not found, method not allowed, not acceptable, request timeout, conflict, gone, bad extension, temporarily not available, call leg does not exist, transaction does not exist, does not exist anywhere, no route to destination, no route to specified transit network, or unallocated number.

In some implementations, the peering network interface 304 queries (322) the local number portability database 310 to determine whether the telephone number 555-555-0111 has recently been ported. For example, the peering network interface 304 can perform an LNP dip operation of an LNP database.

The local number portability database 310 responds (324) to the peering network interface 304 that the telephone number 555-555-0111 has not been ported. In the example of an LNP dip operation, the response can include the current LRN associated with the telephone number 555-555-0111, and the peering network interface can compare the LRN provided by the local number portability database 310 to a locally stored LRN (e.g., within the record corresponding to the telephone number 555-555-0111, stored within the peering database 306). If the provided LRN does not match the locally stored LRN, for example, the telephone number 555-555-0111 may be assumed to have been ported.

Although, according to the local number portability database 310, the telephone number 555-555-0111 has not been ported, this may not be entirely true. In a first circumstance, the telephone number may have been ported so recently that the local number portability database 310 has not yet been updated. In the example illustrated in FIG. 2, the telephone number 555-555-0111 may have been ported without a need for an update to the LRN (e.g., the second provider is a customer of the same CLEC as the first provider). In this case, the local number portability database 310 may never receive an update regarding the porting of the telephone number.

The peering network interface 304 provides (326) the call offer to telephone number 555-555-0111 to the public telecommunications network 302. Using the LRN associated with the telephone number 555-555-0111, for example, the public telecommunications network 302 routes the call offer. Although, for simplicity, the same public telecommunications network 302 is illustrated as issuing the call offer to the telephone number 555-555-0111 and later receiving the call offer from the peering network interface 304, in some implementations, the latter call offer is provided to a different telecommunications network than the network which provided the former call offer to the peering network interface 304. In other implementations, the call offer is provided to a different network interface or the same network interface of the same public telecommunications network 302 from which the incoming call offer was received.

The public telecommunications network 302 issues (328) a cause code to the peering network interface 304, corresponding to the outcome of the call offer. The cause code, in some implementations, includes a call setup code or a call release code, indicating the success or failure of the routing attempt of the call offer to the telephone number 555-555-0111. For example, the cause code can be included within a Session Initiation Protocol (SIP) message, a Signaling System Number 7 (SS7) protocol message, a Q.931 protocol message, or a H.323 protocol message.

The peering network interface 204 determines (330) whether the cause code indicates that the telephone number 555-555-0111 has likely been ported. If the cause code indicates a routing failure, such as a SIP 404 message or an equivalent, the peering network interface 204 may not be able to discern whether the telephone number has been ported. The failure of the call offer route may be temporary, in some examples, due to late payment of a bill, a network equipment failure along the route, a temporary overloading of network resources, or another transient cause for inaccessibility of the communications device associated with the telephone number 555-555-0111. The peering network interface 204 can maintain the telephone number 555-555-0111 within the peering database 306.

If the cause code includes an indication that the public telecommunications network 302 routed the call offer successfully, such as a normal setup or line busy indication, the telephone number 555-555-0111 appears to have been ported. Because the public telecommunications network 302 has managed to successfully route the call offer to the telephone number 555-555-0111, while the peering network interface 304 was unsuccessful using the network addressing information provided by the peering partner, the peering network interface 304 can assume that the telephone number 555-555-0111 has been ported. In one example, the telephone number 555-555-0111, owned by a first corporate enterprise (e.g., the peering partner), may have been ported to a second corporate enterprise during the acquisition of a division of the first corporate enterprise by the second corporate enterprise. The peering network interface 304 removes (332) the telephone number 555-555-0111 from the peering database 306.

In some implementations, the peering network notifies the peering partner which registered the telephone number of the removal. In some examples, the peering network can notify the peering partner via email, letter, text message, telephone call, facsimile, or online account status update. If the peering partner is an individual, for example, the peering network can contact the individual via email or letter requesting updated routing information for the telephone number.

Example System Architecture

Figure 4:
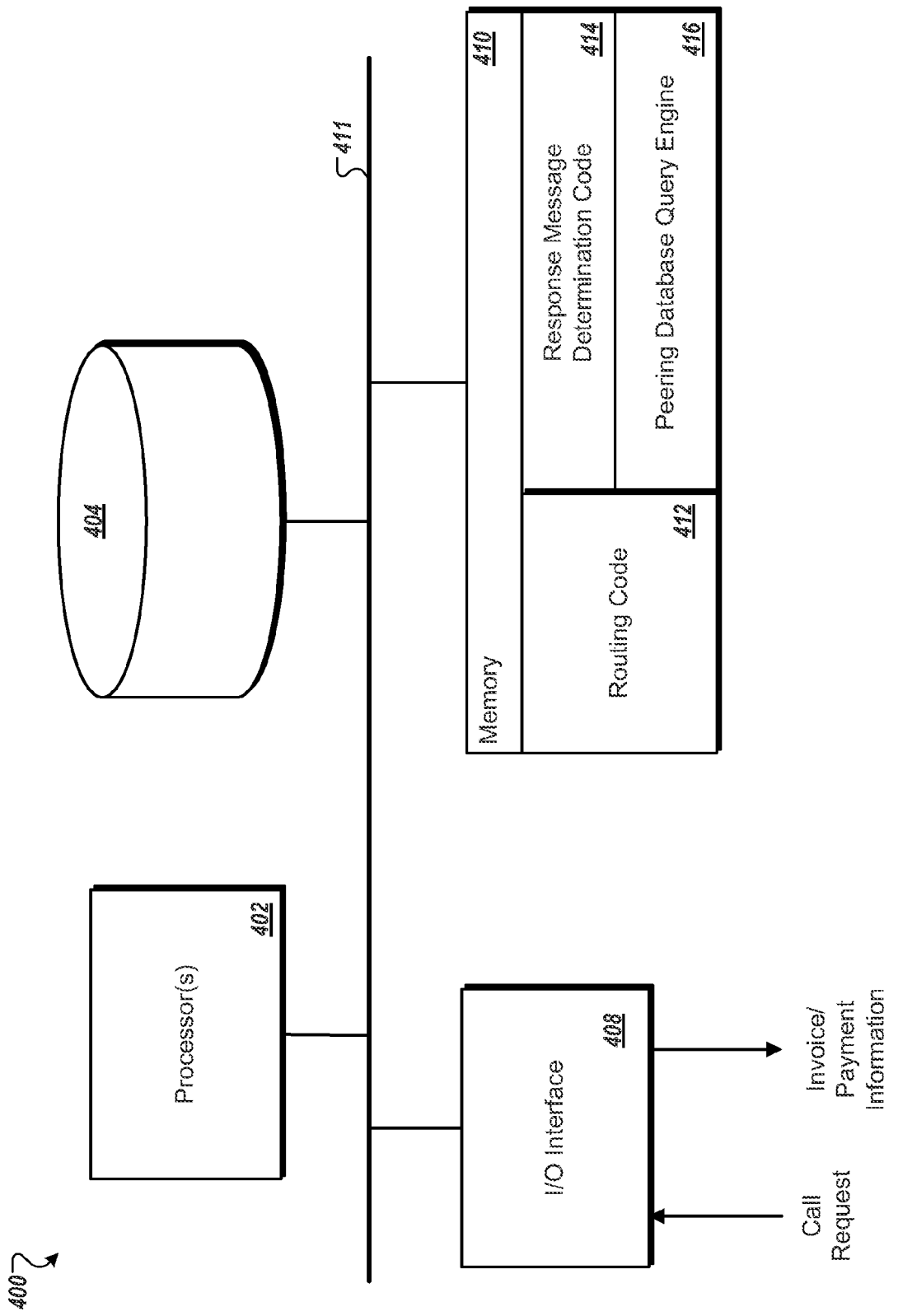
FIG. 4 is a block diagram of an example system architecture for performing the various operations described.

FIG. 4 is a block diagram of an example system architecture 400 for performing the various operations described in reference to FIGS. 1-3. For example, the system 400 may be included in the peering infrastructure 102, described in reference to FIG. 1. The system 400 includes one or more processors 402, a memory 410, a storage device 404, and an input/output interface 408. Each of these components can be interconnected using a system bus 411. The processor 402 is capable of processing instructions for execution within the system 400. In some implementations, the processor 402 is a single-threaded processor. In other implementations, the processor 402 is a multi-threaded processor. The processor 402 is capable of processing instructions stored in the memory 410 or on the storage device 404 to perform the operations described in reference to FIGS. 1-3.

The memory 410 stores information within the system 400. In some implementations, the memory 410 is a computer-readable medium. In other implementations, the memory 410 is a volatile memory unit. In yet other implementations, the memory 410 is a non-volatile memory unit. In the example shown, the memory 410 includes routing code 412 for implementing the operations described in reference to FIGS. 1-3. In some implementations, the routing code 412 includes response message determination code 414 for determining whether call offer responses are indicative of a ported telephone number and peering database query engine code 416 for interfacing with a peering database (e.g., stored within the storage device 404 or in another storage device accessible to the system 400 through the input/output interface 408).

The storage device 404 is capable of providing mass storage for the system 400. In some implementations, the storage device 404 is a computer-readable medium. In various different implementations, the storage device 404 may be a floppy disk device, a hard disk device, an optical disk device, or a tape device.

The input/output interface 408 provides an interface for input/output operations for the system 400. In some implementations, the input/output interface 408 can be coupled to a keyboard and/or pointing device. In other implementations, the input/output interface 408 can be coupled to a display unit for displaying graphical user interfaces.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for facilitating connections and maintaining peering information, comprising:
   receiving, at a telecommunications peering network, a first call offer for a call destined for a telephone number;
   querying a peering database to determine if the telephone number is assigned to a peering partner of the telecommunications peering network;
   determining that the telephone number is assigned to a first peering partner;
   providing a second call offer for the call to the first peering partner;
   receiving a destination unreachable response from the first peering partner regarding the second call offer;
   querying a local number portability database regarding the telephone number;
   receiving a response from the local number portability database indicating that a local routing number associated with the telephone number belongs to a particular CLEC (Competitive Local Exchange Carrier);
   providing a third call offer for the call to a public telecommunications network; and
   receiving a cause code from the public telecommunications network indicating whether the call can be routed;
   wherein each of the receiving, querying, determining and providing steps are implemented by a processing unit at the telecommunications peering network, the processing unit configured to access instructions from a memory device and execute the instructions to achieve each of said steps.

2. The method of claim 1, wherein querying the local number portability database comprises performing an LNP dip operation; and
   receiving a response from the local number portability database includes receiving a local routing number from the local number portability database.

3. The method of claim 1, wherein, if the cause code indicates that the call can be routed, the telephone number is removed from the peering database.

4. The method of claim 3, wherein the cause code is one of a normal setup indication or a line busy indication.

5. The method of claim 1, wherein, if the cause code indicates that the call cannot be routed, the telephone number is maintained within the peering database.

6. The method of claim 5, wherein the cause code includes one of the following causes: bad request, unauthorized, forbidden, not found, method not allowed, not acceptable, request timeout, conflict, gone, bad extension, temporarily not available, call leg does not exist, transaction does not exist, does not exist anywhere, no route to destination, no route to specified transit network, or unallocated number.

7. The method of claim 1, wherein the destination unreachable response includes one of the following causes: bad request, unauthorized, forbidden, not found, method not allowed, not acceptable, request timeout, conflict, gone, bad extension, temporarily not available, call leg does not exist, transaction does not exist, does not exist anywhere, no route to destination, no route to specified transit network, or unallocated number.

8. The method of claim 1, wherein the destination unreachable response is included within a Session Initiation Protocol message, a Signaling System Number 7 protocol message, a Q.931 protocol message, or a H.323 protocol message.

9. The method of claim 1, wherein the cause code is included within a Session Initiation Protocol message, a Signaling System Number 7 protocol message, a Q.931 protocol message, or a H.323 protocol message.

10. The method of claim 1, wherein the public telecommunications network is a public switched telephone network.

11. The method of claim 1, wherein receiving the call offer includes receiving the call offer from a public switched telephone network.

12. The method of claim 1, wherein the peering partner is one of a telecommunications carrier or a third party telecommunications carrier.

13. The method of claim 1, wherein the peering partner is a business enterprise, educational campus, or government enterprise.

14. The method of claim 1, wherein the peering partner is an interne service provider or application service provider.

15. The method of claim 1, wherein the peering partner is an individual.

16. The method of claim 15 further comprising, if the cause code indicates that the call can be routed, contacting the individual to request updated routing information, wherein the contacting is implemented by the processing unit at the telecommunications peering network.

17. A system for facilitating connections and maintaining peering information, comprising:
   means for receiving a call offer at a telecommunications peering network for a call destined for a telephone number;
   means for determining whether the telephone number is assigned to a peering partner;
   means for switching the call offer to a peering partner switch;
   means for receiving a destination unreachable response from the peering partner switch;
   means for querying a local number portability database regarding the telephone number;
   means for receiving a response from the local number portability database indicating that a local routing number associated with the telephone number belongs to a particular CLEC (Competitive Local Exchange Carrier);
   means for transferring the call offer to a public telecommunications network;
   means for receiving a response from the public telecommunications network regarding the success or failure of the transferred call offer;
   upon receipt of a success response, means for removing the telephone number from a collection of peer telephone numbers; and
   upon receipt of a failure response, means for maintaining the telephone number.

\* \* \* \* \*